(12) United States Patent
Nunes et al.

(10) Patent No.: US 11,629,703 B2
(45) Date of Patent: Apr. 18, 2023

(54) WIND TURBINE NACELLE STRUCTURE AND A METHOD OF ASSEMBLING A WIND TURBINE NACELLE STRUCTURE

(71) Applicant: Vestas Wind Systems A/S, Aarhus N. (DK)

(72) Inventors: Joël Saraiva Nunes, Åbyhøj (DK); Morten Hedegaard Petersen, Panders Nv (DK); Thomas Astrup, Silkeborg (DK)

(73) Assignee: Vestas Wind Systems A/S, Aarhus N (DK)

(*) Notice: Subject to any disclaimer, the term of this patent is extended or adjusted under 35 U.S.C. 154(b) by 0 days.

(21) Appl. No.: 17/261,240

(22) PCT Filed: Sep. 19, 2019

(86) PCT No.: PCT/DK2019/050275
§ 371 (c)(1),
(2) Date: Jan. 19, 2021

(87) PCT Pub. No.: WO2020/064069
PCT Pub. Date: Apr. 2, 2020

(65) Prior Publication Data
US 2021/0270250 A1    Sep. 2, 2021

(30) Foreign Application Priority Data

Sep. 24, 2018 (DK) ........................... PA 2018 70621

(51) Int. Cl.
*F03D 80/70*    (2016.01)
*F03D 13/10*    (2016.01)
*F03D 80/80*    (2016.01)

(52) U.S. Cl.
CPC ............. *F03D 80/70* (2016.05); *F03D 13/10* (2016.05); *F03D 80/88* (2016.05); *F05B 2230/60* (2013.01); *F05B 2240/50* (2013.01)

(58) Field of Classification Search
CPC .......... F03D 80/70; F03D 13/10; F03D 80/88; F03D 13/40; F05B 2230/60;
(Continued)

(56) References Cited

U.S. PATENT DOCUMENTS 2,832,895 A * 4/1958 Hutter ................... F03D 7/0224
                                                      416/41
11,306,776 B2* 4/2022 Seko ....................... F16C 19/38
(Continued)

FOREIGN PATENT DOCUMENTS

EP    1319830 A1    6/2003
EP    1860322 A2    11/2007
(Continued)

OTHER PUBLICATIONS

Danish Patent and Trademark Office, Search and Examination Report in PA 2018 70621, dated Apr. 10, 2019.
(Continued)

*Primary Examiner* — Aaron R Eastman
(74) *Attorney, Agent, or Firm* — Wood Herron & Evans LLP

(57) ABSTRACT

A nacelle of a wind turbine generator comprising: a base frame (10) that is separate from and which supports a main bearing housing (12), in use, the base frame (10) being configured to connect with a lower portion of the main bearing housing (12); and a nacelle structure (8) that is separate from and which is connected to the base frame (10) at a first connection, wherein that nacelle structure (8) extends away from the base frame (10) and defines at least in part an interior nacelle volume; characterised in that the
(Continued)

nacelle structure (8) is connected to the main bearing housing (12) by way of a second connection at a point arranged above a plane of a rotor axis of the main bearing housing (12).

17 Claims, 5 Drawing Sheets

(58) Field of Classification Search
CPC .. F05B 2240/50; F05B 2240/14; Y02B 10/30; Y02E 10/72; Y02P 70/50
See application file for complete search history.

(56) References Cited

U.S. PATENT DOCUMENTS

| | | | |
|---|---|---|---|
| 2007/0274838 A1 | 11/2007 | Bagepalli et al. | |
| 2010/0011575 A1* | 1/2010 | Numajiri | B66C 17/04 29/889.1 |
| 2010/0127503 A1 | 5/2010 | Fischer et al. | |
| 2013/0243569 A1* | 9/2013 | Munk-Hansen | F03D 13/10 415/2.1 |
| 2017/0363071 A1 | 12/2017 | Baun et al. | |
| 2019/0127969 A1* | 5/2019 | Petersen | F03D 80/50 |
| 2020/0355167 A1* | 11/2020 | Knoop | F03D 80/50 |
| 2020/0362824 A1* | 11/2020 | Kofman | B66C 1/108 |
| 2021/0079899 A1* | 3/2021 | Demissie | F03D 80/70 |
| 2021/0190033 A1* | 6/2021 | Baun | F03D 13/20 |

FOREIGN PATENT DOCUMENTS

| | | |
|---|---|---|
| EP | 2759701 A1 | 7/2014 |
| EP | 3247899 A1 | 11/2017 |
| WO | 2007096008 A1 | 8/2007 |
| WO | 2013042621 A1 | 3/2013 |

OTHER PUBLICATIONS

European Patent Office, International Search Report and Written Opinion in PCT Application No. PCT/DK2019/050275, dated Nov. 19, 2019.

European Patent Office, Examination Report in EP Application No. 19778424.2, dated Aug. 30, 2022.

Intellectual Property India, Examination Report in IN Application No. 202117018185, dated Jul. 27, 2022.

\* cited by examiner

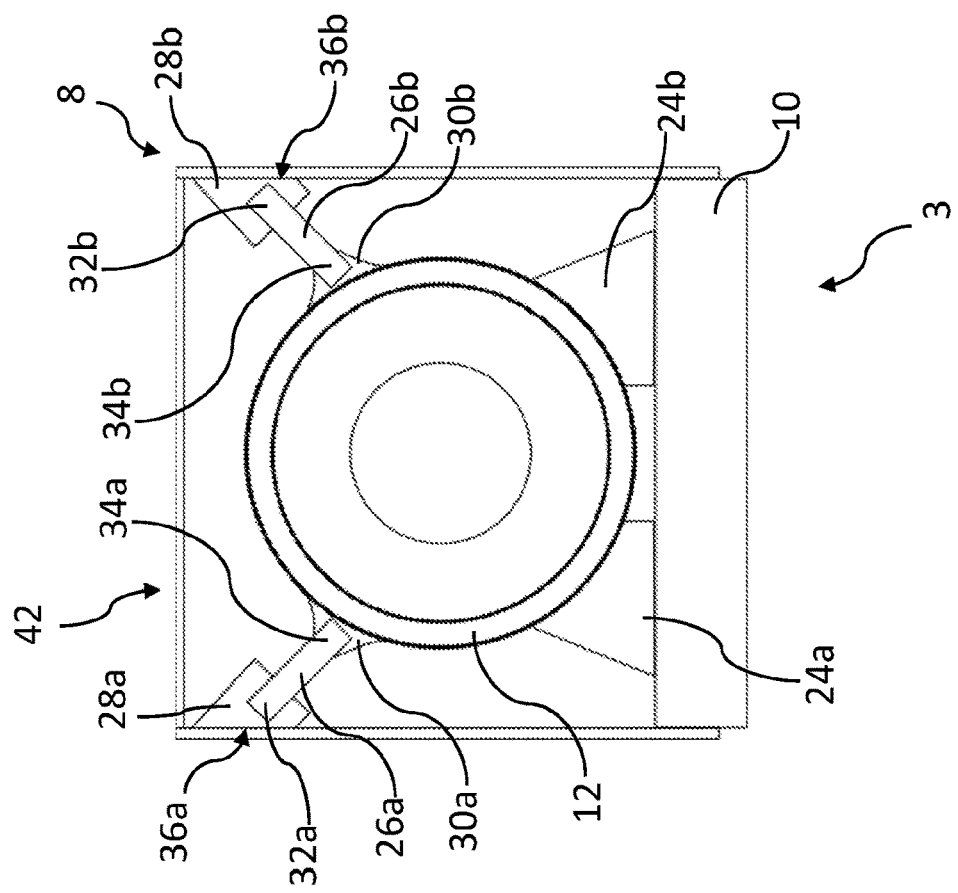
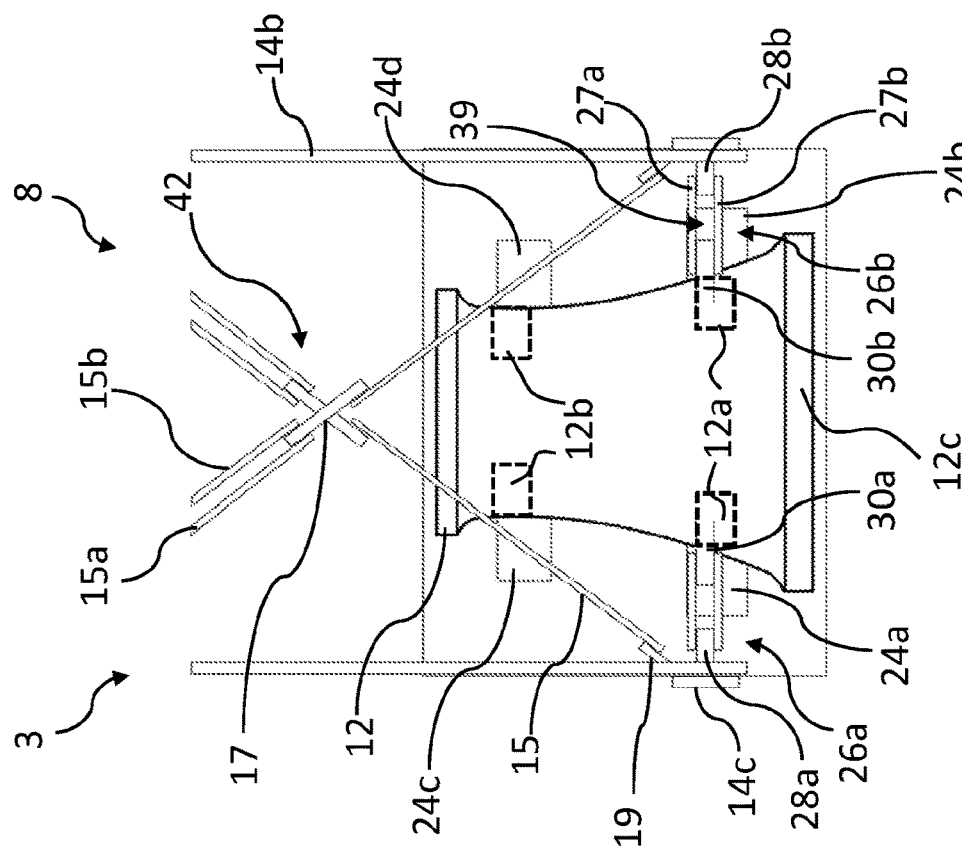
Figure 3b
Figure 3a

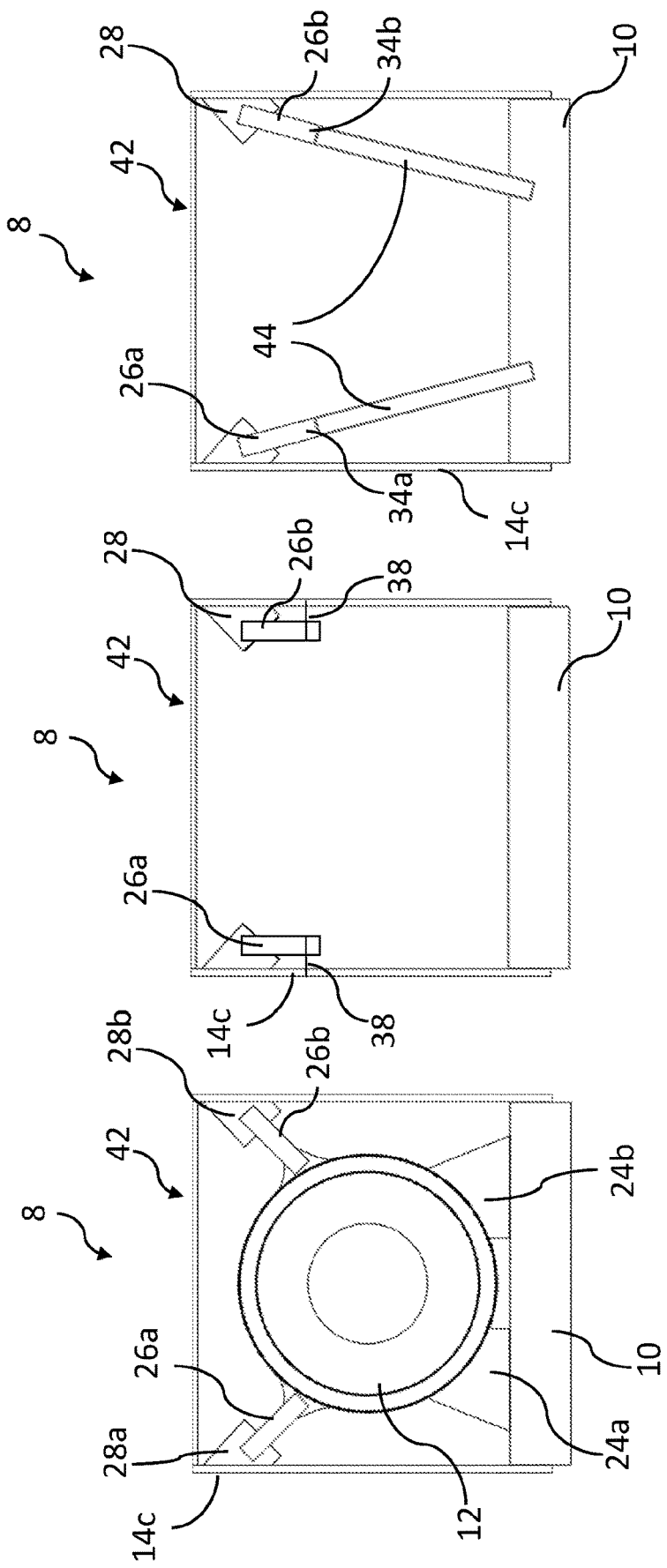

WIND TURBINE NACELLE STRUCTURE AND A METHOD OF ASSEMBLING A WIND TURBINE NACELLE STRUCTURE

TECHNICAL FIELD

The embodiments of the invention relate to wind turbine nacelle structures, and particularly to techniques and approaches of configuring such structures with improved strength and rigidity. The invention also relates to a wind turbine nacelle and also to a method of assembling a wind turbine nacelle.

BACKGROUND

The trend of wind turbine generators (WTGs) growing in size can cause challenges when designing a nacelle. In particular, the nacelle needs to have a structure which is suited to withstanding large dynamic loads which are transmitted to the nacelle by the rotor during operation of the wind turbine generator.

The increased size of the wind turbine generator leads to increasingly large and heavy power generation equipment housed within the nacelle structure, which must be up to the task of supporting the considerable mass of such equipment. However, there is also a need to limit the overall increase in the total mass of the nacelle in order to mitigate the pendulum effect of positioning such a large mass at the top of a wind turbine tower, and also to reduce the cost of transporting the nacelle structure to the wind turbine generator construction site.

It is an aim of the present invention to address these issues.

SUMMARY OF INVENTION

According to an embodiment of the invention there is provided a nacelle of a wind turbine generator comprising: a base frame that is separate from and which supports a main bearing housing, in use, the base frame being configured to connect with a lower portion of the main bearing housing; and a nacelle structure that is separate from and which is connected to the base frame at a first connection, wherein that nacelle structure extends away from the base frame and defines at least in part an interior nacelle volume; characterised in that the nacelle structure is connected to the main bearing housing by way of a second connection at a point arranged above a plane of a rotor axis of the main bearing housing.

In conventional nacelle structures, there is no connection between the main bearing housing and the nacelle structure except through the base frame. This means that the nacelle structure must be designed to withstand the significant torsional forces that it experiences in use. However, in the embodiments of the invention, the second connection provides a physical connection between the nacelle structure and the main bearing housing which means that the main bearing housing forms part of the load path of the nacelle structure. As a result, the nacelle structure is not required to be as strong as in conventional nacelles and so can be designed as a lighter structure. A further benefit is realised during transportation and installation of the nacelle structure. This is because the nacelle structure is transported without the main bearing housing is in place. During transportation the nacelle structure does not need to have the strength required during operation, so the relatively lightweight nacelle structure is easier to transport and install.

The second connection may comprise a connecting member that extends from the nacelle structure and is adapted for connection to the main bearing housing at a fixing point which is above a plane of a rotor axis of the main bearing housing. This is a convenient point for coupling the main bearing housing to the nacelle structure as it allows a straight load path to be formed between the two components which is the most efficient way to transmit force. Furthermore, positioning the fixing point above the rotor axis reduces the required length of the connecting member which reduces the bending moment of the member in use and also reduces the mass of that component.

The connecting member may be pivotably coupled to the nacelle structure. This is advantageous as it means that the connecting member can be pivoted towards and away from the fixing point providing a benefit during installation of the main bearing housing into the nacelle structure.

The connecting member may be movable between a stowed position, in which the connecting member is substantially aligned with an elongated member of the nacelle structure, and a deployed position in which the connecting member is arranged for connection to the main bearing housing. This enables the connecting member to be attached to the nacelle structure and stowed in an unobtrusive position whilst the nacelle structure is being transported to a desired location. The connecting member can then be conveniently pivoted into the deployed position when the main bearing housing is installed within the interior of the nacelle structure to thereby form the second connection between the nacelle structure and the main bearing housing.

The connecting member may comprise an elongate portion arranged between a first connecting end and a second connecting end. The first connecting end may be arranged at an angle to the elongate portion. Preferably, the first connecting end may be angled at 45° to the elongate portion in order to increase the packaging efficiency of the joint formed between the connecting member and a receiving portion of the nacelle structure.

A first end of the connecting member may be connected to the nacelle structure and a second end is bifurcated so as to define a pair of arms for connection to a fixing of the main bearing housing. As the connecting end of the connecting member is bifurcated or forked, the two arms are able to embrace a tab-like fixing member provided on the surface of the main bearing housing, thus resulting in a secure connection to it. The first end of the connecting member may be bifurcated or forked in order to connect with a fixing of the nacelle structure.

The first end of the connecting member may be connected to the nacelle structure a joint between two elongated members, or beams, of the nacelle structure. The joint between two beams of the nacelle structure provides a point of strength on which to mount the connecting member, which is thereby able to withstand greater torsional forces which are exerted on the nacelle structure.

The second connection may depend from an upper portion of the nacelle structure. This advantageously reduces the length of connecting member between the nacelle structure and the upper portion of the main bearing house. This arrangement also provides the most direct, and efficient, load bearing pathway between the nacelle structure and the main bearing housing.

The second connection may comprise two points of connection with the nacelle structure. An arrangement having two points of connection is better able to withstand and absorb the forces that exerted upon the nacelle structure during operation of the wind turbine by distributing those forces between the two points of connection.

The two points of connection may be arranged at opposing lateral portions of the nacelle structure. By separating the points of connection laterally across the nacelle structure, the second connection is better able to resist the torsional and tensional forces that are exerted upon the nacelle structure during operation of the wind turbine generator.

The second connection may be configured to form two points of connection with the main bearing housing. Two independent connecting members may define separate load bearing pathways between the nacelle structure and the main bearing housing.

The nacelle structure may include an opening configured to allow passage of a main bearing housing to be installed onto the base frame through the nacelle structure. Such a configuration offers a convenient route for the main bearing housing to be installed onto the base frame through the nacelle structure during assembly of the wind turbine.

The nacelle structure may include a closure element that is connectable to the nacelle structure to close the opening. The closure element, when installed in the nacelle structure, provides the strength and rigidity required to transport the nacelle to a desired location. The closure element enables the temporary opening of the nacelle structure to allow the main bearing housing to be installed onto the base frame.

The nacelle structure may comprise a frame-like form and may connect to the main bearing housing to form an integral load bearing structure. The integrated structure allows for the even distribution of the forces that exerted upon the nacelle during operation of the wind turbine. The nacelle may comprise the nacelle structure according to any of the preceding paragraphs and a main bearing housing installed onto the base frame.

According to an further embodiment of the invention there is provided a method of assembling a nacelle comprising a main bearing housing and a nacelle structure, when assembled, the method comprising: transporting the nacelle structure and the main bearing housing separately to a site for construction of the wind turbine generator; arranging the main bearing housing onto a base frame of the nacelle, the base frame defining a first connection with the nacelle structure, the nacelle structure extending away from the base frame and defining at least in part an interior nacelle volume; and connecting the nacelle structure to the main bearing housing by way of a second connection at a point arranged above a plane of a rotor axis of the main bearing housing.

The method may comprise connecting a reinforcement member of the nacelle structure to the base frame, prior to transporting the nacelle structure. The reinforcement member provides support and added stiffness to the nacelle structure when the main bearing housing is not installed onto the base frame. The reinforcement member provides suitable stiffness to the nacelle structure that would otherwise be provided by the first and second connections between the nacelle structure and the main bearing housing.

The method may comprise disconnecting the reinforcement member before connecting the main bearing housing to the nacelle structure. The reinforcement member may be connected to the nacelle structure for when it is being transported or manoeuvred to a desired location.

It will be appreciated that the foregoing represents only some of the possibilities with respect to the particular components of a nacelle that may be included, as well as the arrangement of those components with the main bearing housing. Accordingly, it will be further appreciated that embodiments of a nacelle including other or additional components and structural arrangements remain within the spirit and scope of the present invention. Additional components may include, for example, systems relating to power generation.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIGS. 3a and 3b are plan and front views, respectively, of the nacelle structure shown in FIG. 2;

FIGS. 4a, 4b and 4c are front views of the nacelle structure in FIG. 2 shown in different configurations during transportation and assembly.

DESCRIPTION OF THE INVENTION

In the following detailed description, reference is made to the accompanying drawings which illustrate specific embodiments of the invention. These embodiments are described in sufficient detail to enable those of ordinary skill in the art to make and use them. However, it should be appreciated that the Figures are in a simplified form so as not to obscure key principles of the invention with unnecessary detail.

Figure 1:
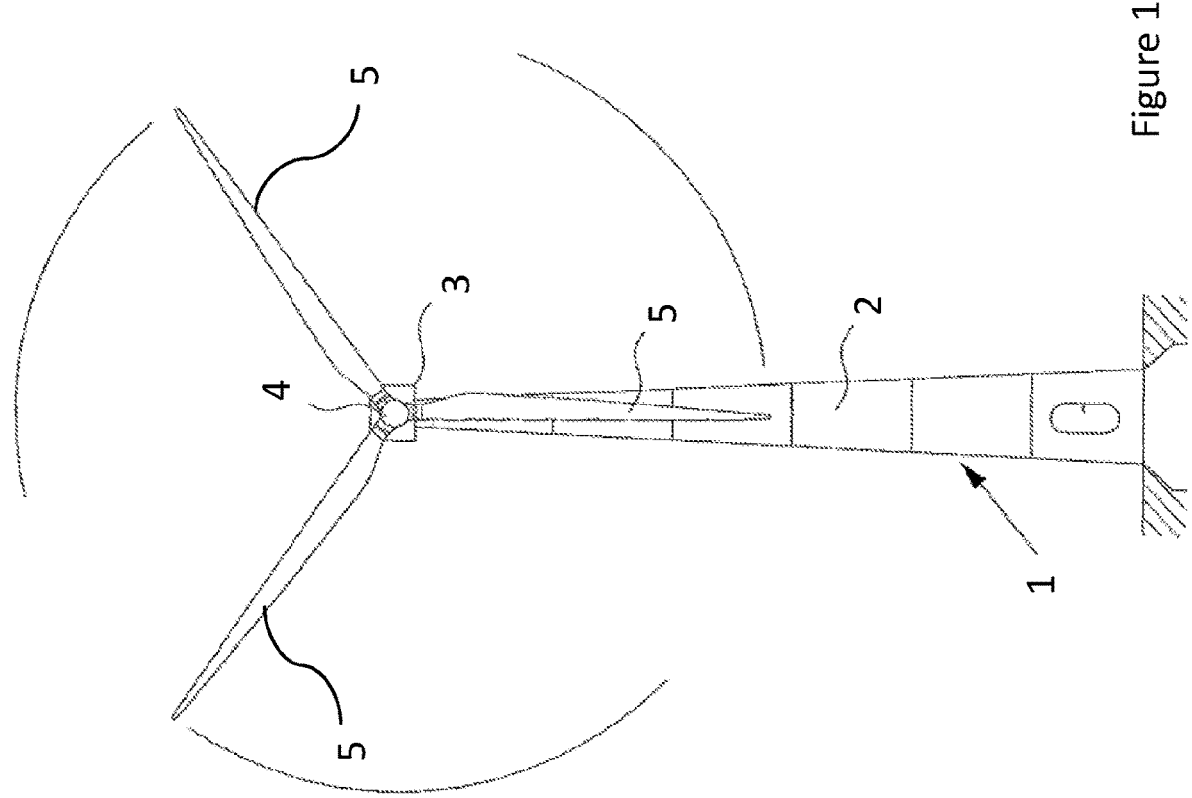
FIG. 1 illustrates a wind turbine in which embodiments of the invention may be implemented.
Figure 2:
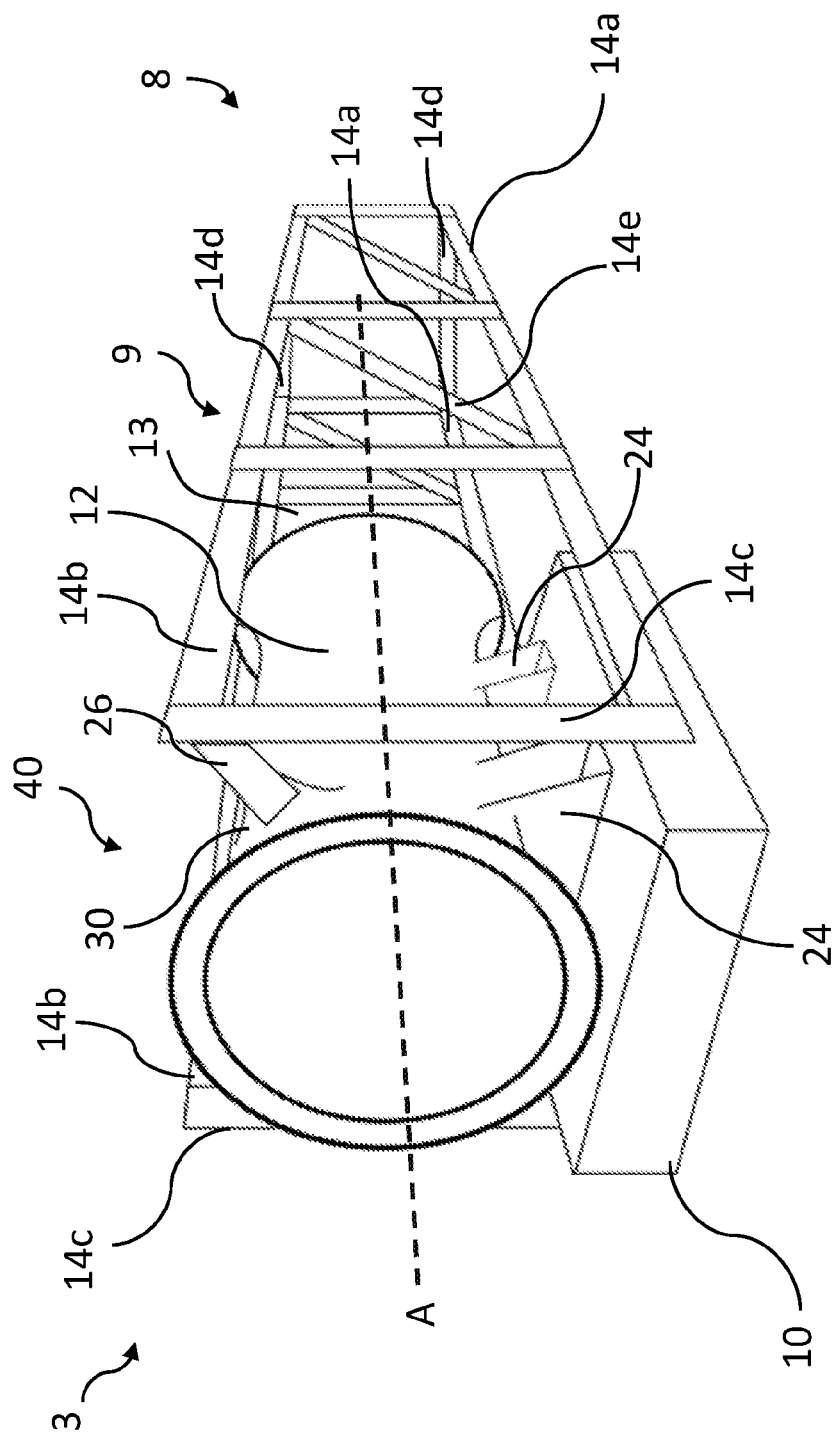
FIG. 2 is a perspective view of a nacelle structure according to one embodiment of the invention, that may form part of the nacelle of the wind turbine in FIG. 1.

FIG. 1 illustrates a wind turbine 1 comprising a tower 2, a nacelle 3, a rotor 4 with three blades 5, as is conventional. A perspective view of the nacelle 3 is shown in in FIG. 2 in which an outer wall or skin of the nacelle is removed to reveal a nacelle structure 8 mounted to a base frame 10. FIGS. 3a and 3b also show, respectively, a plan view and a front view of the nacelle 3.

The base frame 10 is arranged at the base of a forward portion of the nacelle structure 8. As would be understood by the skilled person, the base frame 10 defines the main interface between the nacelle and the tower 2 of the wind turbine and supports a main bearing housing 12. Although not shown in the Figures, the main bearing housing 12 rotatably supports a drive shaft that is connected between the rotor 4 of the wind turbine positioned in front of the forward end of the nacelle structure 8 and a generator typically housed in a rearward portion of the nacelle structure 8 together with various other power generation components of the nacelle 3. In this way, the nacelle structure 8 defines a rear frame of the nacelle 3 being configured, when in use, to provide stiffness and strength to the nacelle 3 so that it can accommodate and support the various power generation components of the wind turbine 1. When assembled with the base frame 10, the nacelle structure 8 defines at least in part an interior nacelle volume 13 that is suitably adapted to accommodate the main bearing housing 12, together with the other components of the wind turbine 1. It should be appreciated that the base frame 10, the main bearing housing 12 and the nacelle structure 8 are separate components which are connected to each other. In current wind turbine design, typically the base frame (sometimes called a bed plate) is the main structural component that is connected to the top end of the tower and which provides a load structure for the main bearing housing. In this context the nacelle structure is a separate component/assembly to the base frame and the main bearing housing, is mounted to the base frame and, as such, provides the structural containment of the other components of the wind turbine. Such a structural design is typical in modern day utility-scale wind turbines (e.g. about 1 MW), where the separate base frame, main bearing housing and nacelle structure provide flexibility in how the nacelle is configured and, in particular, this design provides scalability between relatively small-scale wind turbines and much larger wind turbines.

The main bearing housing 12 is the central element of the drive train of the wind turbine 1. The bearing housing 12 comprises a central bearing on which the drive shaft is supported. Note that in this embodiment the main bearing housing 12 includes a forward bearing 12a at an axially forward position and a rear or 'aft' bearing 12b at a relative rearward axial position distal from a hub connection 12c of the main bearing housing. The bearing enables transmission of torque from the rotor 4 to the generator with the fewest possible losses, whilst simultaneously bracing against the forces and moments which arise during rotation of the rotor 4. A rotational axis A, or rotor axis, of the main bearing housing 12 is aligned in parallel with a longitudinal direction of the nacelle structure 8, as depicted by the broken line shown in FIG. 2.

The nacelle structure 8 is frame-like in nature and connects with the main bearing housing 12 to form an integral load bearing structure of the nacelle 3. The nacelle structure 8 comprises a plurality of vertically, longitudinally and transversely arranged truss members, or beams 14, which interconnect at a plurality of joints 16 that are arranged at the node points between the beams 14. The beams 14 are connected at the joints 16 by means of bolts, screws, splits or the like. In this way, the members or beams 14 provide a frame type structure, or skeleton, comprising a number of interlocking rectangular portions of the nacelle 3.

A sub-frame in the form of two lower beams 14a of the nacelle structure 8 extend from the base frame 10 towards the rearward end of the nacelle 3 so as to define the base of the nacelle structure 8. The lower beams 14a extend in a direction which is parallel to, and on opposite sides of, the rotational axis A of the main bearing housing 12. Two further beams 14b extend along the length of the nacelle structure 8 in parallel to the lower beams 14a to define a roof portion 9 of the nacelle structure 8. Four vertically aligned beams 14c are further arranged between the upper and lower beams 14a, 14b on each side of the nacelle 3 to form three rectangular frame portions, which define the side walls of the nacelle structure 8. Two transversely arranged beams 14d are arranged to connect the rearward ends of the upper and lower beams 14a, 14b which thereby forms a rectangular frame portion at the rearward end of the nacelle structure 8. The skilled person would appreciate that the precise form of the nacelle structure 8 as shown in the Figures is not crucial as different forms may provide the same or similar overall function. However, the principle of the nacelle structure 8 is that it is a load bearing platform that provides support to various components located within it. Accordingly, it extends away from the base frame 10 to provide an open volume within which those components are located, and it also supports an outer wall, skin or fairing to provide environmental protection for those components.

According to the specific example of the nacelle structure 8 as described here, the nacelle structure 8 comprises three rectangular frame portions arranged adjacently along the length of the nacelle 3. Diagonally arranged beams 14e are arranged in the two most rearward rectangular frame portions in each side wall of the nacelle structure 8. Each of the diagonally orientated beams 14e are arranged at a 45 degree angle to the vertically arranged beams 14c so as to bisect each rectangular frame portion by connecting an upper rearward joint 16a to a lower forward joint 16b.

The nacelle structure 8 is connected to the base frame 10 of the nacelle at a forward end of the nacelle structure 8. As shown here, a lower longitudinally arranged beam 14a meets a forward most vertical beam 14c. The vertical and longitudinal beams 14c, 14a are bolted to the base frame 10 by way of a suitable attachment means as would be understood by the skilled person. It will be appreciated that other suitable attachment methods may be used without diverting from the scope of the present invention.

The nacelle structure 8 comprises an opening 40 at the forward end of the roof section, situated at least partially above the base member 10. The opening 40 is configured to allow passage of the main bearing housing 12 to be installed onto the base frame 12 through the nacelle structure 8. With particular reference to FIGS. 3a and 3b, the nacelle structure 8 includes a closure element 42 that is connectable to the nacelle structure 8 to close the opening 40 once the main bearing housing 12 is installed onto the base frame 12. When installed within the nacelle structure 8, the closure element 42 provides increased strength and rigidity to the nacelle 3.

The closure element 42 comprises an assembly of beams which are arranged in an X-shaped configuration, as shown in FIG. 3a. The X-shaped configuration comprises four obliquely arranged beams 15 which are mounted, at their respective ends, by bolting or welding to an X-shaped central bracket 17, which is suspended above the nacelle structure 8. Each of the oblique beams 15 are further mounted, at their opposite ends, to a flange element 19 disposed on an inward facing surface of the upper longitudinal support beams 14b of the nacelle structure 8. The two forward most oblique beams 15 are each comprised of a single arm, whereas the rearmost oblique beams 15 each bifurcated to form two arm members 15a, 15b. The two arm members 15a, 15b of each bifurcated beam are arranged to overlap a leaf of the X-shaped central bracket 17 at one end and to overlap a corresponding flange element (not shown) at their opposite ends. In alternative embodiments the closure element 42 may comprise a single element or beam which is arranged to close the opening 40 of the nacelle structure 8, as would be readily understood by the skilled person. An advantageous feature of the closure element 42 is that it is releasably fixed to the nacelle structure 8 so that it can be removed and replaced in order to allow the main bearing housing 12 to be installed onto the base frame 10. The closure element 42 provides improved rigidity and stiffness to the roof 9 of the nacelle structure 8 when it is secured in position.

As explained above, during assembly of the nacelle 3 the main bearing housing 12 is lowered through the opening 40 in the nacelle structure 8 and then positioned onto the base frame 10. The main bearing housing 12 comprises four feet 24 which are located on a lower portion of the main bearing housing 12 and are each adapted to be fixed to the base frame 10. The feet 24 thereby define a first connection between the nacelle structure 8 and the main bearing housing 12. The feet 24 of the first connection are configured to provide support for the main bearing housing 12 so that it may withstand the rotational forces which are exerted upon it by the turbine rotor 4.

A second connection between the nacelle structure 8 and the main bearing housing 12 is formed by at least one connecting member 26 which is arranged at the forward upper end of the nacelle structure 8. The connecting member 26 extends from an upper portion of the nacelle structure 8, and is adapted for connection to the main bearing housing 12 at a point arranged above a plane of the rotational axis A. Notably, in this embodiment the connecting member 26 connects to the main bearing housing 12 at the axially forward end thereof. Thus the connecting member 26 connects to the main bearing housing 12 at a point proximate to the front bearing 12a of the main bearing housing 12, and considerably forward of a rear bearing 12b of the main bearing housing 12. In effect, therefore, this configuration means that the main bearing housing 12 is contained or housed substantially entirely within the interior nacelle volume 13 of the nacelle structure 8. Expressed another way, the nacelle structure 8 extends about or surrounds substantially the entirety of the main bearing housing 12. This is in contrast to other nacelle designs in which the main bearing housing may be supported in such a way that the main bearing housing appears to protrude out of the forward end of the nacelle structure.

With particular reference to FIGS. 3a and 3b, the first connection comprises four feet 24a-d which are arranged in two pairs, with a first pair 24a, 24b being arranged towards a forward end of the main bearing housing 12 and second pair 24c, 24d being arranged towards the rear end of the main bearing housing 12, as shown in FIGS. 3a and 3b. The feet in each of the forward 24a, 24b and rearward 24c, 24d pairs are arranged either side of the rotation axis A of the main bearing housing 12. Note that the first pair of connection feet 24a,b and the second pair of connection feet 24c,d are arranged on the base frame 10 in a location such they are within the interior nacelle volume 13 defined by the nacelle structure 8. It should also be appreciated that the first pair of connection feet 24a,b are aligned along the nacelle major axis with the point at which the connection member 26 connects to the main bearing housing 12. The front pair of connection feet 24a,b are thus in a position that are axially rearwards of the front point of the nacelle structure 8. Furthermore, the second pair of connection feet 24c,d are spaced along the direction of the nacelle major axis in a rearwards position so that they are further from a hub connection 12c of the main bearing housing 12 as compared to the position of the first and second feet 24a,b.

The second connection comprises two connecting members 26a, 26b which are arranged at opposing lateral portions of the nacelle structure 8, with each connecting member 26a, 26b depending from the nacelle structure 8 and extending towards the main bearing housing 12. A first end 32a, 32b of each connecting member 26a, 26b is connected to the nacelle structure 8 via a corresponding flange 28a, 28b. The two flanges 28a, 28b are mounted on opposing lateral portions of the nacelle structure 8 on the inner surface of a corresponding vertical beam 14c. The flanges 28a, 28b are both arranged at an upper portion of the nacelle structure 8 as is shown in FIG. 3b. By separating the points of connection laterally across the nacelle structure 8, the second connection is better able to resist the torsional and tensional forces that are exerted upon the nacelle structure 8 during operation of the wind turbine 1.

A second end 34a, 34b of each connecting member 26a, 26b is connected to a further flange 30a, 30b which is mounted to an exterior surface of the main bearing housing 12. Where the connecting members 26a, 26b meet the nacelle structure 8, they define two separate points of connection with the nacelle structure 8. Likewise, where the two connecting members 26a, 26b connect to the main bearing housing 12, they define two separate points of connection with the main bearing housing 12. Accordingly, the pair of connecting members 26a, 26b provides two independent points of connection between the nacelle structure 8 and the main bearing housing 12. An arrangement having two points of connection is better able to withstand and absorb the forces that exerted upon the nacelle structure 8 during operation of the wind turbine 1, by distributing those forces between the two points of connection.

As shown here, the connecting members extend between an upper portion of the nacelle structure 8 and a point on the main bearing housing 12 which is above the rotational axis A. Accordingly, the connecting members 26a, 26b, in conjunction with the feet 24 and the main bearing housing 12, provide a continuous vertical load bearing pathway between the base frame 10 and the upper portion of the nacelle structure 8 through which forces that are exerted upon the nacelle structure 8 can be channelled. In particular, the second connection allows torsional and tensional forces to be directed via the main bearing housing 12 into the base frame 10, and thereon through into the tower 3, below.

Although in the illustrated embodiment a pair of connecting members 26a, 26b is provided, it should be understood that other forms of connection arrangements could be provided between the nacelle structure 8 and the main bearing housing 12 that perform an equivalent function. For example, it is envisaged that a single connecting member may be used to connect the nacelle structure 8 to the main bearing housing.

Furthermore, it would be clear to the skilled person that the second connection of the nacelle structure 8 could comprise more than two connecting members 26. Alternatively, or in addition, each connecting member 26 could form two or more points of connection with either the nacelle structure 8 or the main bearing housing 12. In certain embodiments the connecting member 26 may comprise a plurality of wires. Each wire may share a single point of connection with the nacelle structure 8 and may extend to a separate point of connection on the exterior surface of the main bearing housing 12, thereby forming multiple points of contact with the main bearing housing 12.

The right connecting member 26b will now be described in more detail with reference to FIGS. 3a and 3b. The connecting member 26b is bifurcated so as to define a pair of arms 27a, 27b, as shown in FIG. 3a. The first bifurcated end 32b is arranged to connect with the flange 28b of the nacelle structure 8 and the second bifurcated end 34b is configured to connect to the flange 30b on the main bearing housing 12. As the connecting ends of the connecting member 26b is bifurcated or forked, the two arms 27a, 27b are able to embrace the tab like fixing members, or flanges, which are provided on the surface of the main bearing housing 12 and the nacelle structure 8, thereby providing a secure connection between the two components.

The connection between the first end 30a, 30b of each connecting member 26a, 26b and the respective flange 28a, 28b of the nacelle structure 8, defines a pivot joint 36a, 36b. The pivot joints 36a, 36b are arranged such that the connecting members 26a, 26b are pivotably coupled to a vertically aligned beam 14c of the nacelle structure 8. The pivot joints 36a, 26b allow movement of the connecting members 26a, 26b, in a transverse plane relative to the nacelle structure 8, between a first position and a second position.

The first position defines the deployed position in which the connecting members 26a, 26b are arranged for connection to the main bearing housing 12, as shown in FIG. 4a. In the deployed position, the connecting members 26a, 26b are arranged at 45 degrees to a vertically aligned beam 14c of the nacelle structure 8. It is also clear from FIG. 4a that each flange 28a, 28b is arranged to project at the same 45 degree angle from the interior surface of the vertically aligned beams 14c.

The second positon defines a stowed position of the connecting members 26a, 26b, in which the connecting members are substantially aligned in parallel with the vertically aligned beam 14c of the nacelle structure 8, as shown in FIG. 4b. A locking means 38 of the nacelle structure 8 is provided to hold each connecting member in the stowed position when, for example, the main bearing housing 12 is being installed onto the base frame 10, or when the nacelle structure 8 is being transported without the main bearing housing 12.

The locking means 38 comprises a tie or fastening which wraps around each connecting member 26a, 26b and the corresponding vertical beam 14c in order to prevent the free end of each connecting member from moving independently from the nacelle structure 8. Alternatively, the locking means 38 may be provided at the pivot joint 36 and may take the form of a locking pin or latch. The locking means may, thus, be adapted to allow substantially free pivotal movement of the pivot joint 36 when the locking mechanism is in an unlocked position, and wherein such free pivotal movement is prevented or restricted when the locking mechanism is in a locked position.

A third position of the pivot joints 36a, 36b, as shown in FIG. 4c, allows the connecting members to be connected directly, via a reinforcement member 44, to the base frame 10 of the nacelle structure 8. The reinforcement member 44 is a fully removable temporary supporting member (i.e. a cable or an elongated beam), which is installed in the nacelle structure 8 during transportation of the nacelle 3 to the construction site of the wind turbine 1, and then removed just before the main bearing housing 12 is arranged within the nacelle 3. The reinforcement member 44 can easily be mounted on and detached from the nacelle structure 8.

The nacelle structure 8 may be configured so that it is sufficiently stiff when the second connection with the main bearing housing 12 is in place so that it can provide support for the power generation apparatus needed for the wind turbine to operate. However, this may result in the nacelle structure 8 being too flexible without the second connection and so during the transportation of the nacelle 3, the reinforcement member 44 is used to form a temporary connection between the upper portion of the nacelle structure 8 and the base frame 10. The reinforcement member 44 is then removed from the nacelle structure 8 when the nacelle 3 arrives at the installation site of the wind turbine 1. Advantageously, the reinforcement member 44 can be mounted to the nacelle structure 8 when extreme loads are expected, and detached when extreme loads are no longer expected.

Accordingly, the nacelle structure 8 is capable of handling extreme loads without having to design the nacelle structure 8 so that it can handle such extreme loads permanently, and thereby the manufacturing costs and the weight of the nacelle structure 8 are maintained at a low level.

The second end 34a, 34b of each connecting member 26a, 26b is adapted so that it can be releasably connected to both the main bearing housing 12 and the reinforcement member 44. The reinforcement member 44 acts as a locking means 38 by retaining the connecting members 26a, 26b in the third pivot position, as shown in FIG. 4c. Therefore, the reinforcement member 44 removes the need for a separate locking means such as the fastenings shown in FIG. 4b. It will be appreciated that the reinforcement member 44 may be arranged to bypass the connecting members 26a, 26b in order to connect directly to the nacelle structure 8. For example, a wire may be arranged to extend directly from a fixation point on the base frame 10 to the flanges 28a, 28b of the nacelle structure 8. In such a configuration, a separate locking means 38 may be required in order to hold the connecting members in the stowed positon during transportation of the nacelle structure 8.

Figure 5:
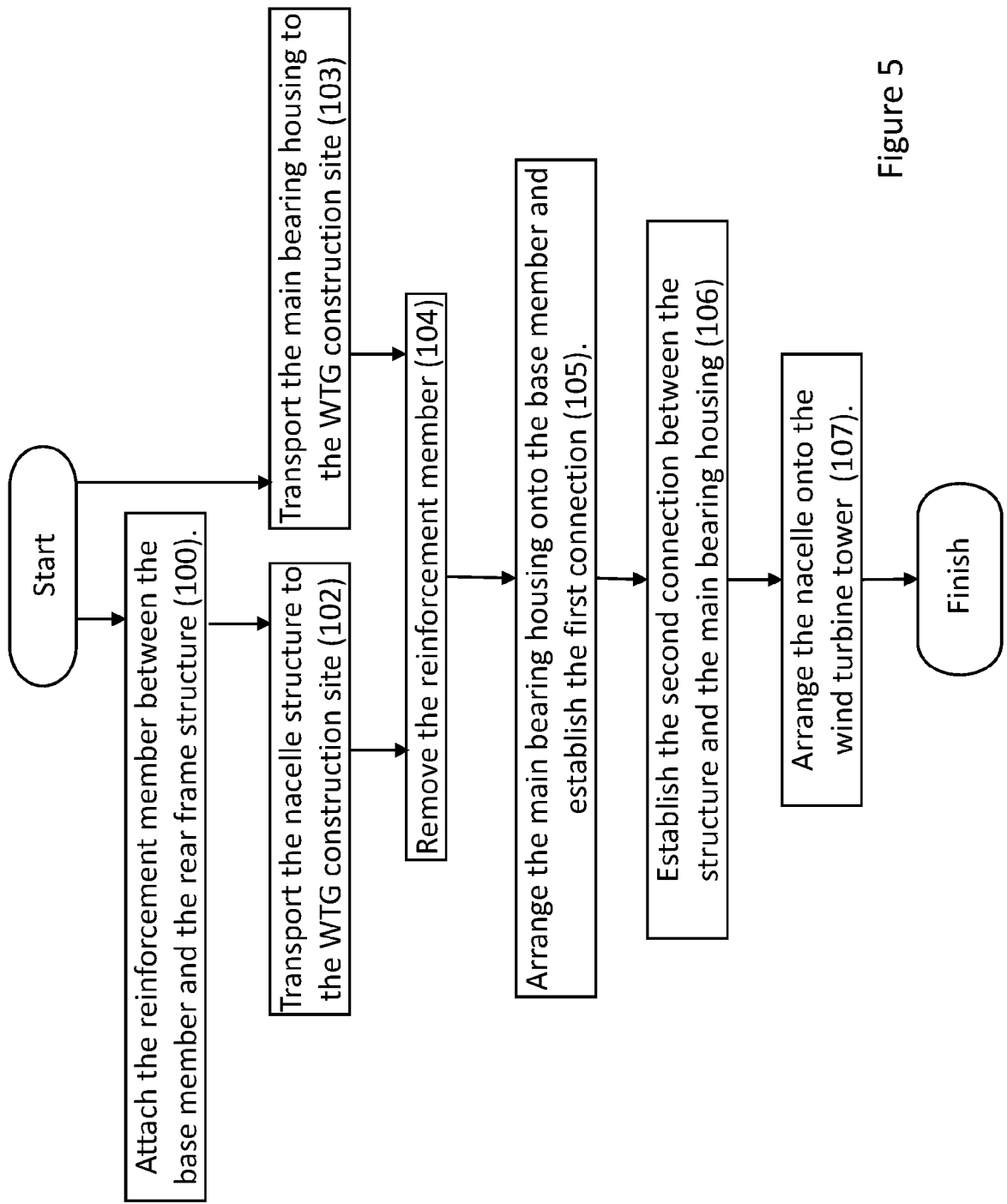
FIG. 5 is a flow chart of a method of assembling a nacelle according to the invention.

A method of assembling the wind turbine will now be described with reference to the flow chart of FIG. 5 which illustrates the different steps of the assembly process according to an aspect of the present invention.

The method commences with a first step 100 which comprises the connection of the reinforcement member 44 between the nacelle structure 8 and the base frame 10. As explained above, the reinforcement member 44 provides suitable stiffness to the nacelle structure 8 that would otherwise be provided by the first and second connections between the nacelle structure 8 and the main bearing housing 12. The nacelle structure 8 is then transported to the construction site of the wind turbine generator 1, as shown in step 102. The nacelle structure 8 comprises a main bearing housing 10 and a rear frame structure as is described above with reference to FIG. 2.

In a concurrent first step 103, the main bearing housing 12 is also transported separately to the nacelle structure 8. In particular, the main bearing housing 12 is transported to the construction site whilst not being physically attached to the nacelle structure 8. It will be understood by the skilled person that the main bearing housing 12 may be transported to and from the same start and end locations and/or by means of the same vehicle.

After the nacelle structure 8 has arrived at the construction site, the reinforcement member 44 is removed in step 104. Where the reinforcement member 44 is arranged between connecting members 26a, 26b and the base frame 10, the connecting members 26a, 26b may be pivoted into a stowed position following removal of the reinforcement member 44. This will ensure that they do not obstruct the installation of the main bearing housing 12 onto the base frame 10. For embodiments where the reinforcement member 44 is connected directly to the nacelle structure 8, the connecting members 26a, 26b may already be held in the stowed position by a separate locking means 38.

The space between the two bifurcated arms 27a, 27b defines a channel 39 along its length. It will be appreciated by the skilled person that the channel 39 may be configured to receive at least a portion of the adjacent vertical beam 14c of the nacelle structure 8 when the connecting member 26b is arranged in the stowed position. In this way, the connecting member 26b may be adapted to sit close to the nacelle structure 8 when stowed, which is an unobtrusive configuration.

Prior to installing the main bearing housing 12 onto the base frame 10, the closure element is removed from the roof portion of the nacelle structure 8. The next step is then to lower the main bearing housing 12 through the opening 40 in the nacelle structure 8 and onto the base frame 10 below, as indicated by step 105. The first connection between the nacelle structure 8 and the main bearing housing 12 is formed as the feet 24 of the main bearing housing 12 are fixed to the base frame 10.

Once the main bearing housing 12 is installed onto the base frame 10, the connecting members 26a, 26b are pivoted into the deployed position and attached to the main bearing housing 12 to form the second connection between the nacelle structure 8 and the main bearing housing 12 (see step 106). The closure element 42 is also repositioned into the roof of the nacelle structure 8 and fastened into place.

Finally, once the second connection has been established between the main bearing housing 12 and the nacelle structure 8, the nacelle 3 has sufficient stiffness and strength to be installed on top of the tower of the wind turbine, as shown in step 107 of the assembly method.

Additional intervening steps may be carried out at different stages throughout the nacelle assembly process. Such additional assembly steps may include, for example, the installation of power generation components and the outer skin of the nacelle.

The invention claimed is:

1. A nacelle of a wind turbine generator, comprising:
   a base frame that is separate from and which supports a main bearing housing, in use, the base frame being configured to directly connect with a lower portion of the main bearing housing; and
   a nacelle structure that is separate from and which is connected to the base frame at a first connection, wherein that nacelle structure extends away from the base frame and defines at least in part an interior nacelle volume;
   wherein the nacelle structure is separate from and connected to the main bearing housing by way of a second connection at a point arranged above a plane of a rotor axis of the main bearing housing.

2. The nacelle according to claim 1, wherein the second connection comprises a connecting member that extends from the nacelle structure and is adapted for connection to the main bearing housing.

3. The nacelle according to claim 2, wherein the connecting member is pivotably coupled to the nacelle structure.

4. The nacelle according to claim 3, wherein the connecting member is movable between a stowed position, in which the connecting member is substantially aligned with an elongated member of the nacelle structure, and a deployed position in which the connecting member is arranged for connection to the main bearing housing.

5. The nacelle according to claim 2, wherein a first end of the connecting member is connected to the nacelle structure and a second end is bifurcated so as to define a pair of arms for connection to a fixing of the main bearing housing.

6. The nacelle according to claim 1, wherein the second connection depends from an upper portion of the nacelle structure.

7. The nacelle according to claim 1, wherein the second connection comprises two points of connection with the nacelle structure.

8. The nacelle according to claim 7, wherein the two points of connection are arranged at opposing lateral portions of the nacelle structure.

9. The nacelle according to claim 1, wherein the second connection is configured to form two points of connection with the main bearing housing.

10. The nacelle according to claim 1, wherein the nacelle structure includes an opening at its upper portion, the opening being configured to allow passage of the main bearing housing to be installed onto the base frame through the nacelle structure.

11. The nacelle according to claim 10, wherein the nacelle structure includes a closure element that is connectable to the nacelle structure to close the opening.

12. The nacelle according to claim 1, wherein the nacelle structure is frame-like in form and connects to the main bearing housing to form an integral load bearing structure.

13. A nacelle of a wind turbine generator, comprising:
   a base frame that is separate from and which supports a main bearing housing, in use, the base frame being configured to connect with a lower portion of the main bearing housing; and
   a nacelle structure that is separate from and which is connected to the base frame at a first connection, wherein that nacelle structure extends away from the base frame and defines at least in part an interior nacelle volume,
   wherein the nacelle structure is separate from and connected to the main bearing housing by way of a second connection at a point arranged above a plane of a rotor axis of the main bearing housing,
   wherein the second connection comprises a connecting member that extends from the nacelle structure and is adapted for connection to the main bearing housing, and
   wherein the connecting member connects to the main bearing housing at an axially forward end thereof.

14. A nacelle of a wind turbine generator, comprising:
   a base frame that is separate from and which supports a main bearing housing, in use, the base frame being configured to connect with a lower portion of the main bearing housing; and
   a nacelle structure that is separate from and which is connected to the base frame at a first connection, wherein that nacelle structure extends away from the base frame and defines at least in part an interior nacelle volume;
   wherein the nacelle structure is connected to the main bearing housing by way of a second connection at a point arranged above a plane of a rotor axis of the main bearing housing,
   wherein the main bearing housing is substantially contained within the interior nacelle volume.

15. A method of assembling a nacelle for a wind turbine generator, the nacelle comprising a main bearing housing and a nacelle structure when assembled, the method comprising:
   transporting the nacelle structure and the main bearing housing separately to a site for construction of the wind turbine generator;
   arranging the main bearing housing directly onto a base frame of the nacelle, the base frame defining a first connection with the nacelle structure, the nacelle structure extending away from the base frame and defining at least in part an interior nacelle volume; and
   connecting the nacelle structure to the main bearing housing by way of a second connection at a point arranged above a plane of a rotor axis of the main bearing housing.

16. A method of assembling a nacelle for a wind turbine generator, the nacelle comprising a main bearing housing and a nacelle structure when assembled, the method comprising:
- transporting the nacelle structure and the main bearing housing separately to a site for construction of the wind turbine generator;
- arranging the main bearing housing directly onto a base frame of the nacelle, the base frame defining a first connection with the nacelle structure, the nacelle structure extending away from the base frame and defining at least in part an interior nacelle volume; and
- connecting the nacelle structure to the main bearing housing by way of a second connection at a point arranged above a plane of a rotor axis of the main bearing housing,
- wherein the method comprises connecting a reinforcing member between the nacelle structure and the base frame, prior to transporting the nacelle structure.

17. The method according to claim 16, wherein the method comprises disconnecting the reinforcing member before connecting the main bearing housing to the nacelle structure.

\* \* \* \* \*